United States Patent [19]

Ball

[11] Patent Number: 5,409,077
[45] Date of Patent: Apr. 25, 1995

[54] VEHICULAR STEERING WHEEL ANTI-THEFT APPARATUS

[76] Inventor: J. M. Ball, 20079 E. Penn Ave., Dunnellon, Fla. 34432

[21] Appl. No.: 285,180

[22] Filed: Aug. 3, 1994

[51] Int. Cl.$^6$ .............................................. B60R 25/02
[52] U.S. Cl. ..................................... 180/287; 70/209; 70/226; 70/238
[58] Field of Search ................... 180/287; 70/209, 211, 70/212, 225, 226, 237, 238

[56] References Cited

U.S. PATENT DOCUMENTS

| | | | |
|---|---|---|---|
| D. 306,252 | 2/1990 | Johnson | D8/331 |
| 4,887,484 | 12/1989 | Pang | 70/209 |
| 5,031,429 | 7/1991 | Wang | 70/209 |
| 5,062,282 | 11/1991 | Rong | 70/209 |
| 5,113,672 | 5/1992 | Wang | 70/209 |
| 5,138,853 | 8/1992 | Chen | 70/209 |
| 5,163,309 | 11/1992 | Wu | 70/209 |

Primary Examiner—Margaret A. Focarino
Assistant Examiner—Paul N. Dickson

[57] ABSTRACT

A vehicular steering wheel anti-theft apparatus comprising a steering wheel having a handle, a hub adapted to be coupled to a steering column of a vehicle, a pair of spokes symmetrically disposed about the hub and aligned about a common central axis with each spoke coupled between the hub and handle, a bore formed through the spokes and hub with the bore having a sealed end and an open end extended through the handle; a spring mechanism disposed within the bore; and a plunging rod having a head end slidably disposed within the bore abutted against the spring mechanism and a tip end extended from the bore, the plunging rod having an extended orientation for enabling the tip end to be abutted against a portion of a vehicle and thereby prevent the steering wheel from being rotated and a retracted orientation for precluding such abutment and thereby allow the steering wheel to be rotated.

4 Claims, 4 Drawing Sheets

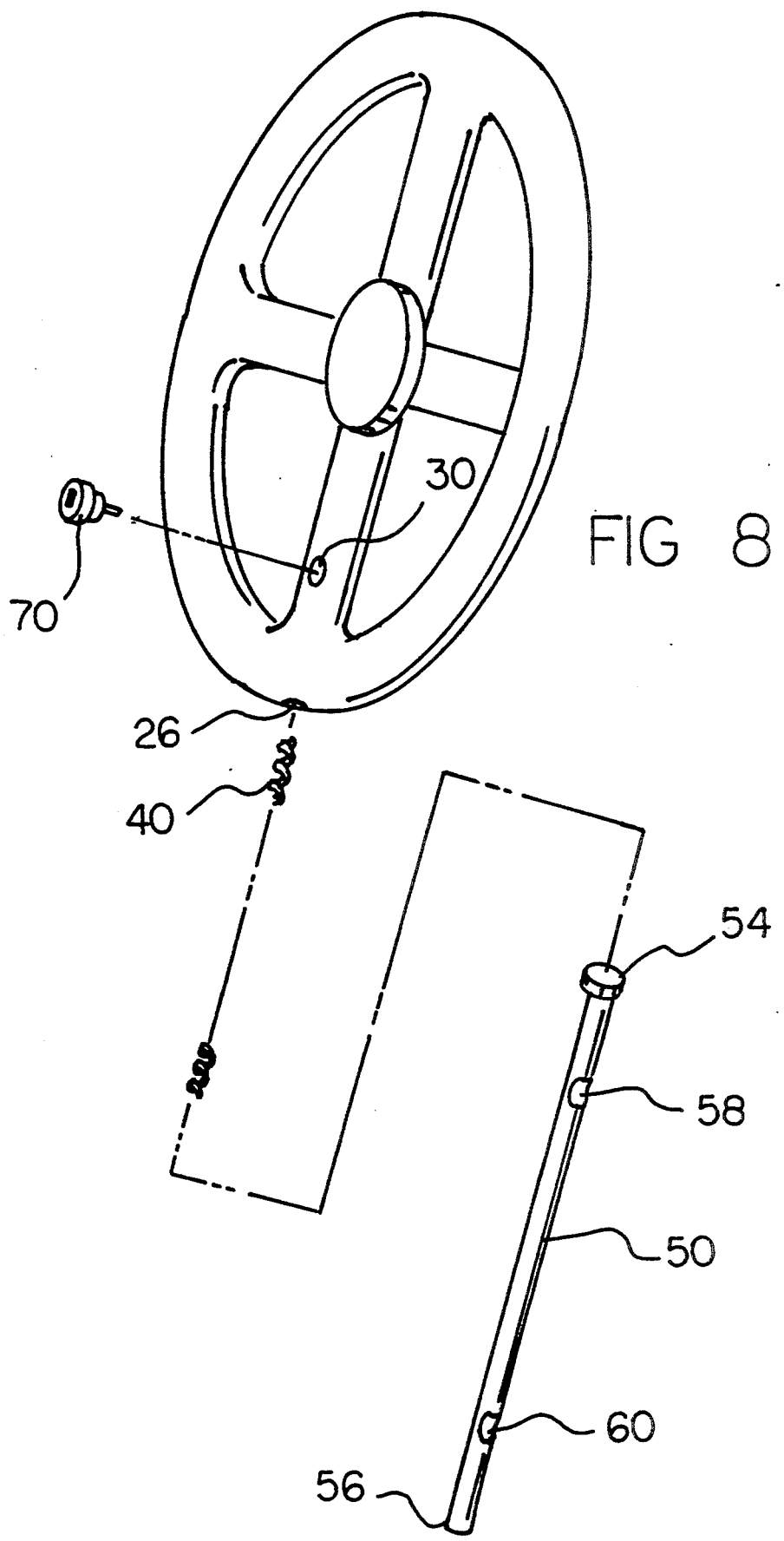

VEHICULAR STEERING WHEEL ANTI-THEFT APPARATUS

BACKGROUND OF THE INVENTION

1. Field of the Invention

The present invention relates to a vehicular steering wheel anti-theft apparatus and more particularly pertains to preventing a steering wheel of a vehicle from being turned and thus preventing unauthorized operation of the vehicle with a vehicular steering wheel anti-theft apparatus.

2. Description of the Prior Art

The use of vehicular anti-theft devices is known in the prior art. More specifically, vehicular anti-theft devices heretofore devised and utilized for the purpose of preventing operation of a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 306,252 to Johnson discloses an automobile steering wheel lock arm. U.S. Pat. No. 5,062,282 to Rong discloses an automobile steering lock with a rod anti-releasing mechanism. U.S. Pat. No. 5,113,672 to Wang discloses an automobile steering lock. U.S. Pat. No. 5,138,853 to Chen discloses an anti-theft lock for a vehicle. U.S. Pat. No. 5,163,309 to Wu discloses an automobile steering lock.

While these devices fulfill their respective, particular objective and requirements, the aforementioned patents do not describe a vehicular steering wheel anti-theft apparatus that is extendable from a steering wheel of a vehicle to prevent unauthorized operation of a vehicle and retractable within a steering wheel for allowing operation of a vehicle.

In this respect, the vehicular steering wheel anti-theft apparatus according to the present invention substantially departs from the conventional concepts and designs of the prior art, and in doing so provides an apparatus primarily developed for the purpose of preventing a steering wheel of a vehicle from being turned and thus preventing unauthorized operation of the vehicle.

Therefore, it can be appreciated that there exists a continuing need for new and improved vehicular steering wheel anti-theft apparatus which can be used for preventing a steering wheel of a vehicle from being turned and thus preventing unauthorized operation of the vehicle. In this regard, the present invention substantially fulfills this need.

SUMMARY OF THE INVENTION

In the view of the foregoing disadvantages inherent in the known types of vehicular anti-theft devices now present in the prior art, the present invention provides an improved vehicular steering wheel anti-theft apparatus. As such, the general purpose of the present invention, which will be described subsequently in greater detail, is to provide a new and improved vehicular steering wheel anti-theft apparatus and method which has all the advantages of the prior art and none of the disadvantages.

To attain this, the present invention essentially comprises, in combination, a steering wheel having an annular handle, a generally circular central hub adapted to be coupled to a steering colunm of a vehicle, a first pair of spokes symmetrically disposed about the hub and aligned about a common central first axis with each spoke coupled between the hub and handle, a second pair of spokes symmetrically disposed about the hub and aligned about a common central second axis at a location perpendicular to the first axis with each spoke coupled between the hub and handle, a central linear bore having a circular cross section formed through the first pair of spokes and hub and aligned along the first axis, the bore having a sealed end located adjacent to the coupling of one of the spokes of the first pair with the handle and an open end extended through the handle at a location opposite the coupling of the other spoke of the first pair with the handle, the open end having an inwardly extended integral lip formed therearound, the spoke of the first pair adjacent to the opening further having a lock aperture formed thereon between the hub and handle in communication with the bore. A spring is disposed within the bore with the spring having a first end coupled to the sealed end of the bore and a second end extended therefrom and facing the open end of the bore. A rigid elongated cylindrical plunging rod is included and has a radially extended head end and a tip end. The head end of the plunging rod is slidably disposed within the bore and secured therein due to the lip. The head end is abutted against the second end of the spring. The tip end of the plunging rod is extended from the bore. The plunging rod has an extended orientation for enabling the tip end to be abutted against a portion of a vehicle and thereby prevent the steering wheel from being rotated and a retracted orientation for precluding such abutment and thereby allow the steering wheel to be rotated. The plunging rod further has an upper notch formed thereon near the head end and a lower notch formed thereon near the tip end. The upper notch of the plunging rod is positionable in alignment with the lock aperture of the steering wheel when the plunging rod is placed in the extended orientation. The lower notch of the plunging rod is positionable in alignment with the lock aperture of the steering wheel when the plunging rod is placed in the retracted orientation. Lastly, a lock is included and has a key-actuateable tumbler portion secured within the lock aperture and a rotatable pin portion extended into the bore with the pin portion securable within the upper notch of the plunger for locking the plunger in the extended orientation and with the pin portion securable within the lower notch of the plunger for locking the plunger in the retracted orientation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular steering wheel anti-theft apparatus which has all the advantages of the prior art vehicular anti-theft devices and none of the disadvantages.

It is another object of the present invention to provide a new and improved vehicular steering wheel anti-theft apparatus which may be easily and efficiently manufactured and marketed.

It is a further object of the present invention to provide a new and improved vehicular steering wheel anti-theft apparatus which is of durable and reliable construction.

An even further object of the present invention is to provide a new and improved vehicular steering wheel anti-theft apparatus which is susceptible of a low cost of manufacture with regard to both materials and labor, and which accordingly is then susceptible of low prices of sale to the consuming public, thereby making such a vehicular steering wheel anti-theft apparatus economically available to the buying public.

Still yet another object of the present invention is to provide a new and improved vehicular steering wheel anti-theft apparatus which provides in the apparatuses and methods of the prior art some of the advantages thereof, while simultaneously overcoming some of the disadvantages normally associated therewith.

Even still another object of the present invention is to provide a new and improved vehicular steering wheel anti-theft apparatus for preventing a steering wheel of a vehicle from being turned and thus preventing unauthorized operation of the vehicle.

Lastly, it is an object of the present invention to provide a new and improved vehicular steering wheel anti-theft apparatus comprising a steering wheel having a handle, a hub adapted to be coupled to a steering column of a vehicle, a pair of spokes symmetrically disposed about the hub and aligned about a common central axis with each spoke coupled between the hub and handle, a bore formed through the spokes and hub with the bore having a sealed end and an open end extended through the handle; spring means disposed within the bore; and a plunging rod having a head end slidably disposed within the bore abutted against the spring means and a tip end extended from the bore, the plunging rod having an extended orientation for enabling the tip end to be abutted against a portion of a vehicle and thereby prevent the steering wheel from being rotated and a retracted orientation for precluding such abutment and thereby allow the steering wheel to be rotated.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is an exploded perspective view of the present invention.

The same reference numerals refer to the same parts through the various Figures.

DESCRIPTION OF THE PREFERRED EMBODIMENT

Figure 1:
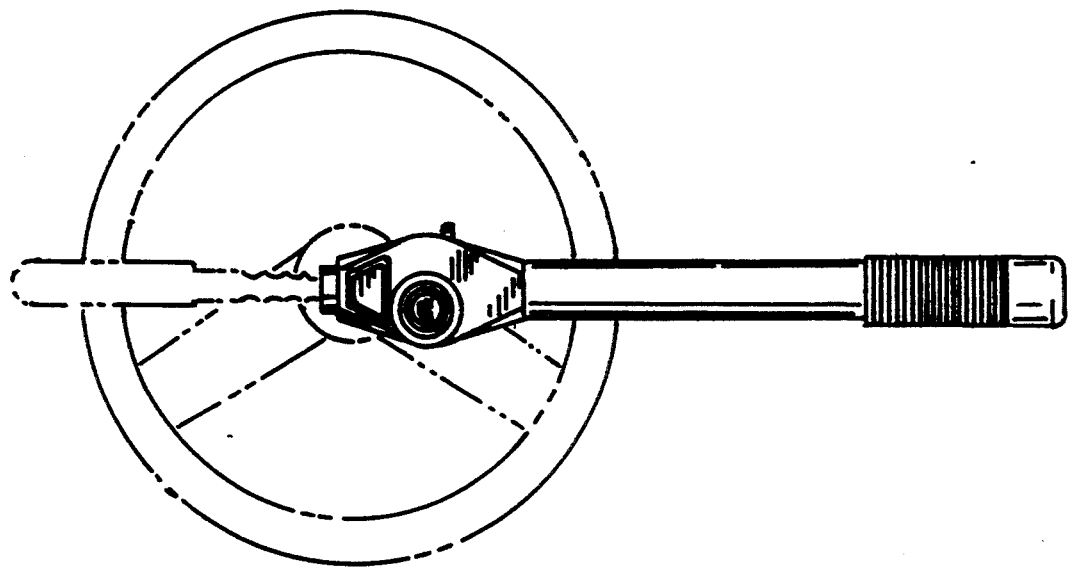
FIG. 1 is a view of a prior art vehicular anti-theft device.
Figure 2:
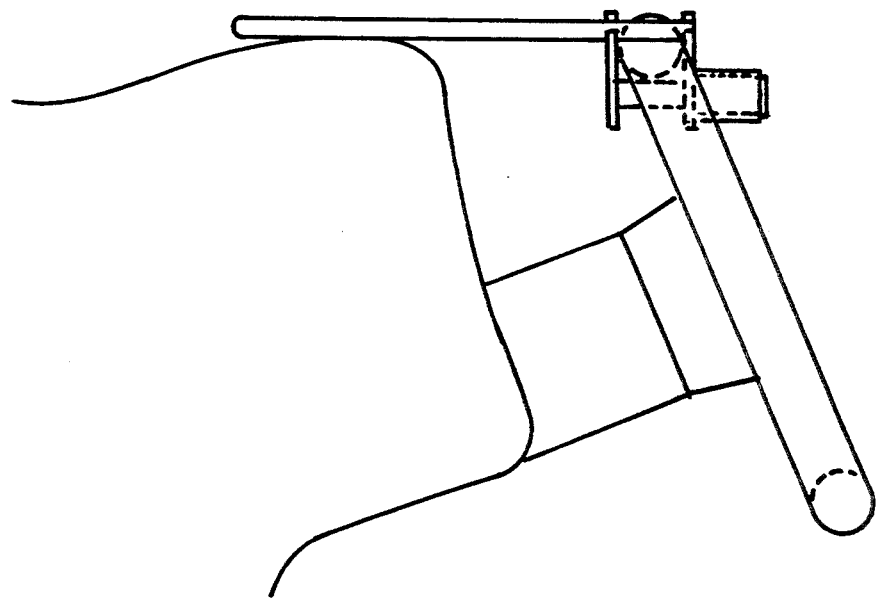
FIG. 2 is a view of yet another prior art vehicular anti-theft device.
Figures 3, 4:
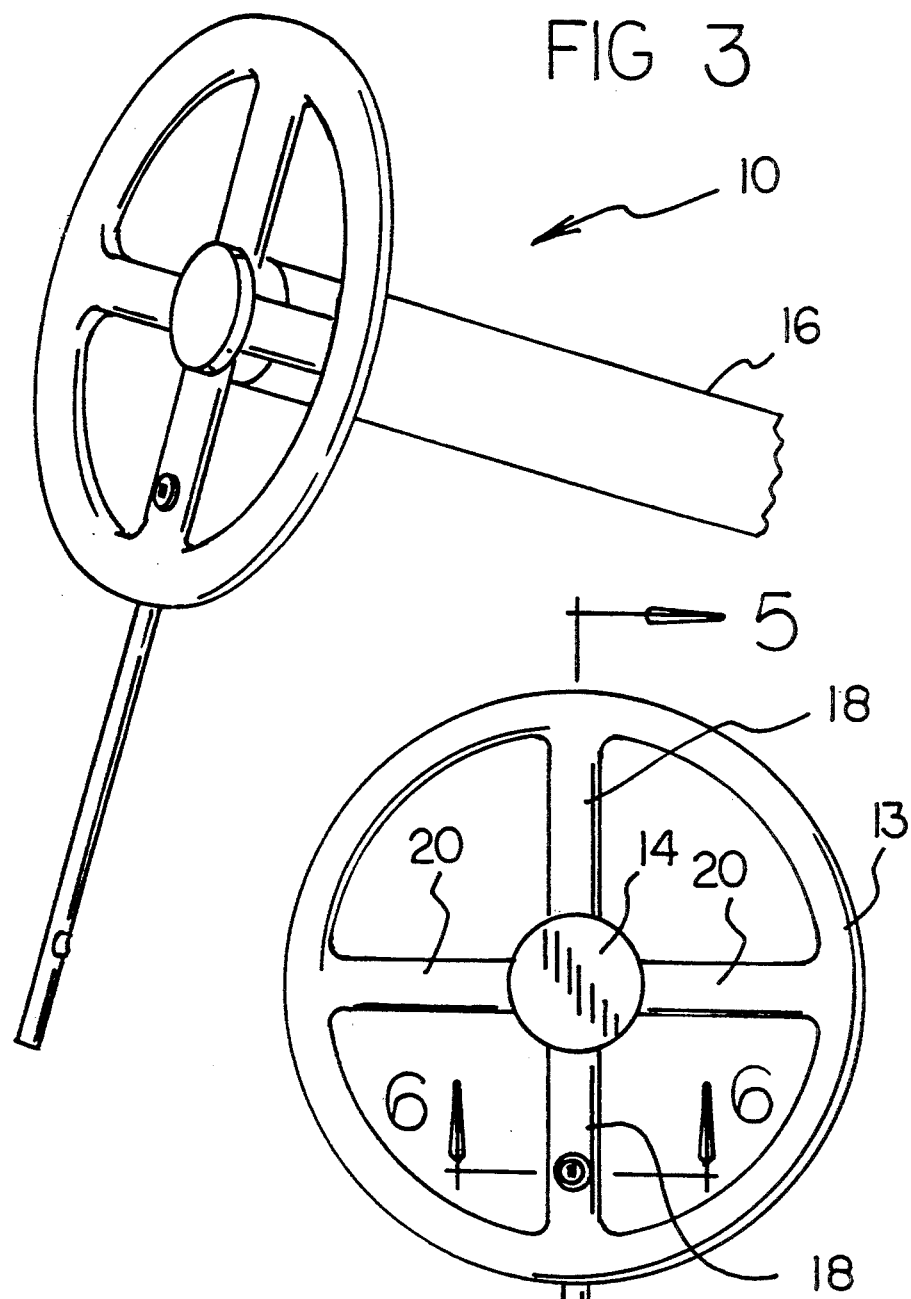
FIG. 3 is a perspective view of the preferred embodiment constructed in accordance with the principles of the present invention.
FIG. 4 is a plan view of the present invention.
Figure 5:
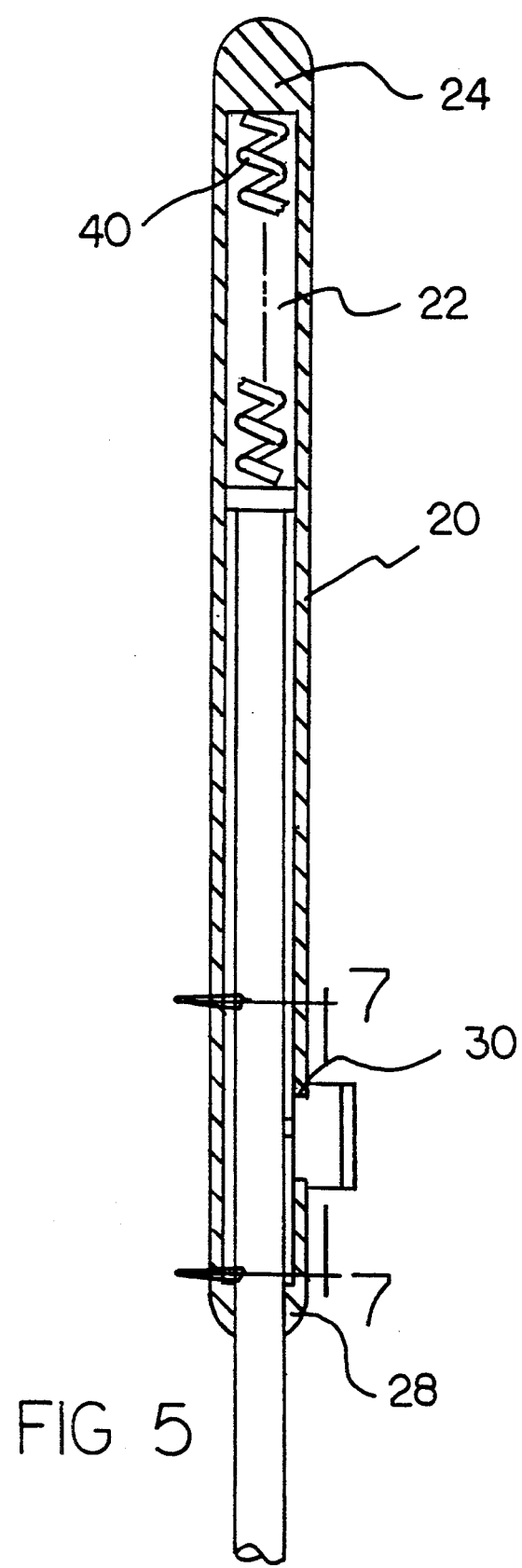
FIG. 5 is a cross-sectional view of the present invention taken along the line 5—5 of FIG. 4.
Figure 6:
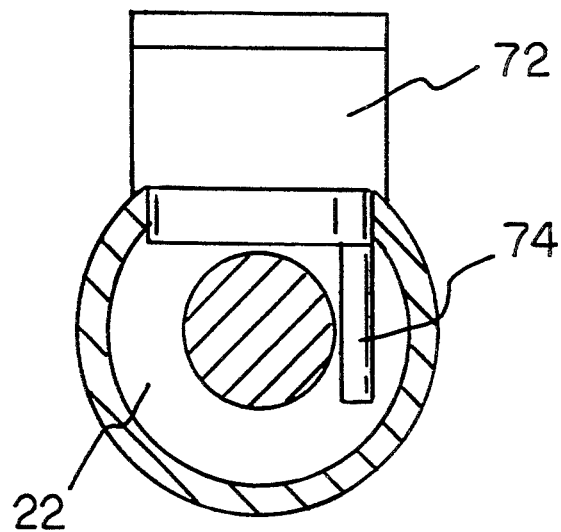
FIG. 6 is a cross-sectional view of the present invention taken along the line 6—6 of FIG. 4.
Figure 7:
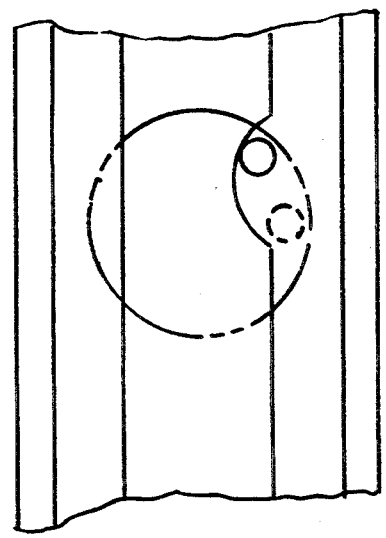
FIG. 7 is a cross-sectional view of the present invention depicting the coupling between the lock and plunging rod taken along the line 7—7 of FIG. 5.

With reference now to the drawings, and in particular, to FIG. 1 thereof, the preferred embodiment of the new and improved vehicular steering wheel anti-theft apparatus embodying the principles and concepts of the present invention and generally designated by the reference number 10 will be described.

Specifically, the present invention essentially includes four major components. The major components are the steering wheel, spring, plunging rod, and lock. These components are interrelated to provide the intended function.

More specifically, it will be noted in the various Figures that the first major component is the steering wheel 12. The steering wheel has an annular handle 13 and a generally circular central hub 14. The central hub is adapted to be coupled to a steering column 16 of a vehicle. The steering wheel includes a first pair of spokes 18. The first pair of spokes are symmetrically disposed about the hub and aligned about a common central first axis. Each spoke of the first pair is coupled between the hub and handle. The steering wheel also includes a second pair of spokes 20. The second pair of spokes are symmetrically disposed about the hub and aligned about a common central second axis positioned at a location perpendicular to the first axis. Each spoke of the second pair is coupled between the hub and handle. The steering wheel includes a central linear bore 22. The bore has a circular cross-section. It is formed through the first pair of spokes 18 and through the hub and aligned along the first axis. The bore has a sealed end 24 located adjacent to the coupling of one of the spokes of the first pair with the handle. The bore has an open end 26 extended through the handle at a location opposite the coupling of the other spoke of the first pair with the handle. Thus, the open end is located on the outer periphery of the handle. The open end includes an inwardly extended lip 28 formed therearound. Furthermore, the spoke of the first pair adjacent to the opening includes a lock aperture 30 formed thereon. The lock aperture is positioned between the hub and handle and is in communication with the bore. The lock aperture is adapted to receive a lock.

The second major component is the spring 40. The spring is formed of metal. It is disposed within the bore 22. The spring has a first end coupled to the sealed end 24 of the bore. The spring also has a second end extended from the sealed end at a location facing the open end 26 of the bore. The spring is adapted for urging a plunging rod abutted thereagainst towards the opening on the handle.

The third major component is the plunging rod 50. The plunging rod is rigid, elongated, and cylindrical in structure. It is formed of a rigid material such as metal or plastic. The plunging rod has a radially extended head end 54 and a tip end 56. The head end is slidably disposed within the bore. The head is secured within the bore due to the inward projection of the lip 28. This securement prevents the plunging rod from sliding completely out of the bore. The head end is abutted against the second end of the spring. The tip end of the plunging rod is extended from the bore through the opening 26. The plunging rod has an extended orientation for enabling the tip end to be abutted against a portion of a vehicle and thereby prevent the steering wheel from being rotated. The plunging rod also has a retracted orientation for precluding such abutment and thereby allowing the steering wheel to be rotated. The plunging rod further has an upper notch 58 formed thereon near the head end and a lower notch 60 formed thereon near the tip end. The upper notch is positionable in alignment with the lock aperture 30 of the steering wheel when the plunging rod is placed in the extended orientation. The lower notch of the plunging rod is positionable in alignment with the lock aperture 30 of the steering wheel when the plunging rod is placed in the retracted orientation.

The fourth major component is the lock 70. The lock has a tumbler portion 72 adapted to be actuated by a key and a rotatable pin portion 74 extended therefrom. The lock is secured within the lock aperture 30 such that the pin portion is extended into the bore 22. The pin portion is securable within the upper notch 58 of the plunger when the tumbler is actuated by a key for locking the plunger in the extended orientation. The pin portion is also securable within the lower notch 60 of the plunger when the tumbler is actuated by a key for locking the plunger in the retracted orientation.

The present invention is an anti-theft device for vehicle steering wheels which is built into the steering wheel to eliminate the awkwardness and storage problems associated with removable type security bars. The present invention consists of a plunging rod and a locking mechanism. The plunging rod is built in to the radial spokes on the steering wheel. It extends out long enough so that the wheel cannot be turned by anyone sitting in the driver's seat. A key lock secures the rod in either the extended or retracted position. The device can be made to fit all makes and models of vehicles to permit replacing steering wheels on existing vehicles with the anti-theft steering wheel. The latter is similar in appearance to existing steering wheels, but has two cross members extending across the diameter of the wheel and positioned perpendicular to each other.

The device is easy to use. Simply insert the key in the lock, and turn it. This will release the rod, and it will slide out of the cross bar. Once the bar is released, the steering wheel is locked into place and cannot be turned. This prevents anyone who breaks into the car from driving it away. Since it is built into the vehicle, the safety device is always available. Unlike other types of anti-theft devices which lock the steering wheel in place, the device cannot be removed by sawing the steering wheel in half. The present invention could be used on all makes of automobiles. Although the present invention utilizes a rigid plunging rod disposed in a bore extended across the entire inner diameter of the handle, a single bored spoke could be utilized in conjunction with a rigid rod or a telescoping and fixedly settable rod disposed therein to achieve essentially the same result.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A vehicular steering wheel anti-theft apparatus for preventing a steering wheel of a vehicle from being turned and thus preventing unauthorized operation of the vehicle comprising, in combination:

a steering wheel having an annular handle, a generally circular central hub adapted to be coupled to a steering column of a vehicle, a first pair of spokes symmetrically disposed about the hub and aligned about a common central first axis with each spoke coupled between the hub and handle, a second pair of spokes symmetrically disposed about the hub and aligned about a common central second axis at a location perpendicular to the first axis with each spoke coupled between the hub and handle, a central linear bore having a circular cross section formed through the first pair of spokes and hub and aligned along the first axis, the bore having a sealed end located adjacent to the coupling of one of the spokes of the first pair with the handle and an open end extended through the handle at a location opposite the coupling of the other spoke of the first pair with the handle, the open end having an inwardly extended integral lip formed therearound, the spoke of the first pair adjacent to the opening further having a lock aperture formed thereon between the hub and handle in communication with the bore;

a spring disposed within the bore with the spring having a first end coupled to the sealed end of the bore and a second end extended therefrom and facing the open end of the bore;

a rigid elongated cylindrical plunging rod having a radially extended head end and a tip end, the head end slidably disposed within the bore and secured therein due to the lip and abutted against the second end of the spring, the tip end extended from the bore, the plunging rod having an extended orientation for enabling the tip end to be abutted against a portion of a vehicle and thereby prevent the steering wheel from being rotated and a retracted orientation for precluding such abutment and thereby allow the steering wheel to be rotated, the plunging rod further having an upper notch formed thereon near the head end and a lower notch formed thereon near the tip end, the upper notch positionable in alignment with the lock aperture of the steering wheel when the plunging rod is placed in the extended orientation, the lower notch positionable in alignment with the lock aperture of the steering wheel when the plunging rod is placed in the retracted orientation; and a lock having a key-actuateable tumbler portion secured within the lock aperture and a rotatable pin portion extended into the bore with the pin portion securable within the upper notch of the plunger for locking the plunger in the extended orientation and with the pin portion securable within the lower notch of the plunger for locking the plunger in the retracted orientation.

2. A vehicular steering wheel anti-theft apparatus comprising:

a steering wheel having a handle, a hub adapted to be coupled to a steering column of a vehicle, a pair of spokes symmetrically disposed about the hub and aligned about a common central axis with each spoke coupled between the hub and handle, a bore formed through the spokes and hub with the bore having a sealed end and an open end extended through the handle;

spring means disposed within the bore; and a plunging rod having a head end slidably disposed within the bore abutted against the spring means and a tip end extended from the bore, the plunging rod having an extended orientation for enabling the tip end to be abutted against a portion of a vehicle and thereby prevent the steering wheel from being rotated and a retracted orientation for precluding such abutment and thereby allow the steering wheel to be rotated.

3. A vehicular steering wheel anti-theft apparatus as set forth in claim 2 further including lock means for securing the plunging rod in the extended orientation and for securing the plunging rod in the retracted orientation.

4. A vehicular steering wheel anti-theft apparatus as set forth in claim 3 wherein the lock means includes:

a lock coupled to the steering wheel and extended into the bore, the lock having an actuateable tumbler portion and a pin portion; and an upper notch formed on the plunging rod near the head end and a lower notch formed thereon near the tip end, the upper notch positionable in alignment with and securable to the pin portion of the lock when the plunging rod is placed in the extended orientation, the lower notch positionable in alignment with and securable to the pin portion of the lock when the plunging rod is placed in the retracted orientation.

* * * * *